United States Patent [19]

Hoehne et al.

[11] Patent Number: 4,968,018
[45] Date of Patent: Nov. 6, 1990

[54] DEVICE FOR SEPARATING, DELIVERING AND DEPOSITING BLANKS

[75] Inventors: Klaus Hoehne, Duisburg; Bernhard Mertel, Enkenback-Alsenborn; Erich Willenbacher, Karlsruhe, all of Fed. Rep. of Germany

[73] Assignee: Pfaff Industriemaschinen GmbH, Kaiserslautern, Fed. Rep. of Germany

[21] Appl. No.: 422,969

[22] Filed: Oct. 18, 1989

[30] Foreign Application Priority Data

Oct. 18, 1988 [DE] Fed. Rep. of Germany ....... 3835452

[51] Int. Cl.$^5$ .......................... B65H 3/08; B65H 3/20
[52] U.S. Cl. .......................... 271/97; 271/33; 271/106; 62/73; 62/351; 165/61; 414/796.5; 414/796.9
[58] Field of Search ............. 414/796.9, 796.5; 271/33, 105, 106, 97, 98; 62/73, 351; 165/61

[56] References Cited

U.S. PATENT DOCUMENTS 3,611,744 10/1971 Sutz ........................................ 271/33
4,887,858 12/1989 Gazzarrini ........................ 414/769.9

Primary Examiner—Albert W. Davis, Jr.
Attorney, Agent, or Firm—McGlew and Tuttle

[57] ABSTRACT

The invention relates to a device for separating, delivering, and depositing material blanks, for use in the textile industry or the like which improves heat transfer to the gripping surface in a device in which the heating device is arranged in such a way that it is protected from external forces. The device comprises a heatable gripping plate, which has a gripping surface and an expansion chamber adjacent thereto, in which a refrigerant is able to expand and thus cool the gripping plate to below the freezing point so that a material blank will freeze onto said gripping surface. The side of the chamber opposite the gripping surface is closed by a nonmetallic intermediate plate whose surfaces are essentially parallel to said gripping surface and can be coated with metal, and which intermediate plate has a noncoated surface with an electrical heating resistor arranged therein and a metal-coated surface that is in metallic connection with a plurality of webs that form a bridge for heat transfer from the intermediate plate to the gripping surface.

9 Claims, 2 Drawing Sheets

DEVICE FOR SEPARATING, DELIVERING AND DEPOSITING BLANKS

BACKGROUND OF THE INVENTION

Field of the Invention

The present invention relates, in general to a device for separating, delivering, and depositing stacked blanks of material and more particularly to improvement on West German publication No. 3212741.

According to the device disclosed in West German 32 17 741 if its gripping surface is pressed against an object and the gripping surface with the film of condensed water formed on it during cooling is cooled to below the freezing point by evaporating off a pressurized refrigerant admitted through an inlet opening in an expansion chamber adjacent to the gripping surface, a firm connection is established between the surface of the object and the gripping surface via the frozen condensed water. The object can be lifted and transported to, for example, a processing machine. The firm connection can be dissolved by heating in order to deposit the object. With this device, warm air is blown into the expansion chamber for heating through the same inlet opening through which the refrigerant was fed to the expansion chamber. Special precautions are therefore needed when the refrigerant is to be circulated in a closed cycle. As an alternative, it is stated in the West German publication that the object may be detached from the gripping surface by heating with an electrical heating coil provided in the gripping plate. However, this method requires resistant electrical insulation of the heating coil from the gripping plate, which will impair the heat transfer to the gripping plate.

West German publication 2404863 discloses a design variant of a freezing gripper, in which heating by an electrical resistor is also used instead of warmed air blown-in to thaw the layer of ice in order to dissolve the connection and deposit the object. To achieve this, the gripping plate, which consists of a material with good thermal conductivity, such as copper, and which material is permanently cooled by a cooling medium to a temperature below the freezing point, is provided on its lower side with webs separated by grooves from one another and is covered with an electrically insulating, heat- and cold-resistant plastic film, which film is pressed into the grooves by bars of a holding rake, so that the foil and the bars stand back behind the lower side of the webs in the zone of the grooves. Electrical strip resistors are laid along the lower side of the webs. They are arranged such that they are isolated from the gripping surface and other parts of the device. The spaces between the bottom of the grooves and the foil are filled with air or another heat insulator in order to keep the heat transfer in the zone of the grooves low and to cool to low temperatures only the webs and—through the film—the strip resistors via the gripping plate.

In this arrangement, the objects to be gripped are frozen directly to the exposed side of the strip resistors and are dropped off by heating the strip resistors. What is disadvantageous here is not only that the strip resistors are freely exposed and unprotected, thus representing a source of hazard for the operating personnel, but also the fact that the strip resistors are loaded by the weight of the object to be lifted, as a result of which they are subject to mechanical wear. Diffusion of heat to the crown of the web, which retards the cooling process, can also be expected to occur with this arrangement. Furthermore, the film, being an insulating layer, also hinders the heat transfer from the gripping plate to the strip resistors during cooling.

SUMMARY OF THE INVENTION

The basic task of the present invention is to design a device for separating, delivering, and depositing stacked blanks of material such that the heat transfer to the gripping surface is improved, with the heating device being arranged such that it is protected from external effects.

According to the invention, the problems of past arrangements are solved by providing a gripping plate formed of a material with good thermal conductivity, which gripping plate includes a surface with a plurality of webs defining a heat transfer bridge. A nonmetallic plate having a metal-coated surface is connected to the plurality of webs, the nonmetallic plate and the gripping plate cooperate to define a chamber adjacent the gripping surface. The nonmetallic plate has a noncoated surface with an electrical heating element arranged thereon. A refrigerant supply means is connected to the chamber for supplying compressed refrigerant to the chamber. Wetting means is provided, connected to the gripping plate, for wetting the gripping surface with a liquid. Compressed refrigerant is introduced into the chamber such that it expands and freezes the wetted gripping surface for gripping the material blank. The heating element heats the gripping surface for depositing the material blank.

The design according to the present invention ensures a large expansion space for the refrigerant admitted under pressure between the webs immediately adjacent the gripping surface, so that rapid removal of heat from the gripping surface is guaranteed. Furthermore, a large contact surface between one side of the intermediate plate which is metal-coated, whose thickness is only a few tenths of one millimeter, and the gripping plate, is available via the webs for rapid heating. Thus, a separate electrical insulating layer between the heating resistor and the gripping plate becomes unnecessary. As was shown by practical experiments and measurements, the cooling time until freezing of the wetting liquid and the heating time until thawing of the layer of ice are substantially reduced by these measures.

An advantageous design of the chamber for guiding the refrigerant includes the webs which subdivide the chamber into a plurality of cavities, the cavities being in communication with one another.

The selection of a ceramic plate as an intermediate plate has its significance in the fact that ceramic can be heated relatively rapidly, it can be coated with metal and thereby be rendered suitable for soldering, and, in addition, it can be used as an electrical insulator. The arrangement also includes an inlet opening to the chamber and an inlet valve connected to the inlet opening. The refrigerant supply is connected to the chamber via the inlet valve and the inlet opening is used to accurately meter the refrigerant to be admitted into the expansion chamber.

The device is designed to include a holder support carrying the gripper plate. The holder support includes a water vapor inlet opening. The water vapor inlet opening is connected to the wetting means. The water vapor inlet opening communicates with the gripping surface through holes passing through the nonmetallic plate and passing through the gripping plate in order to make the degree of wetting of the gripping surface independent of the moisture content in the ambient air.

Due to the design of the device including the gripping plate fastened to a form plate, wherein the form plate is bent upwardly at at least two opposite ends for adapting to the contour shape of the material blank, including compressed air discharge nozzles positioned adjacent the at least two opposite ends for directing air obliquely, outwardly and downwardly toward a stack of material blanks, even material blanks with relatively large surface areas can be separated without problems if the fibers of the individual blanks are entangled in each other at the edges of the blanks, as a disadvantageous consequence of cutting to size in a stack.

The at least two opposite ends of the form plate are provided with clamping levers mounted on the form plate for clamping the material blanks to ensure safe holding of material blanks with large surface areas for transportation to a processing station after separation.

While a specific embodiment of the invention has been shown and described in detail to illustrate the application of the principals of the invention, it will be understood that the invention may be embodied otherwise without departing from such principals.

DESCRIPTION OF THE PREFERRED EMBODIMENT

The gripping plate 1 of the device for separating, delivering, and depositing objects, such as material blanks W with large surface areas, which are available in a stack before processing, is formed of a material with good thermal conductivity, such as copper. Its flat lower side 2 forms the gripping surface for the material blanks W. The gripping plate 1 is provided with grooves 3, which are preferably meander-shaped, are delimited by webs 4, and communicate with one another.

Figure 2:
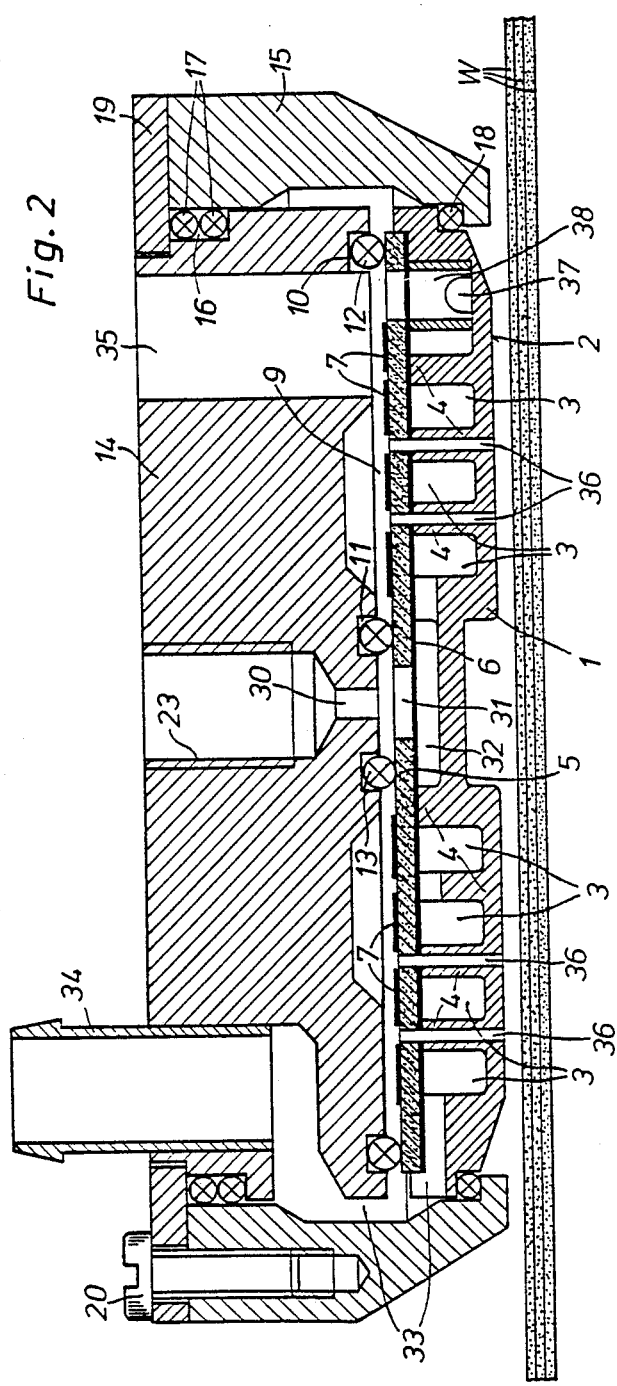
FIG. 2 is a sectional view taken along line II—II in FIG. 1 on a larger scale; and, FIG. 3 is a sectional view taken along line III—III in FIG. 1.

To achieve good heat transfer, the webs 4 of said gripping plate 1 are soldered with silver solder to a thin ceramic plate 5, one side of which is coated with a metal, so that the cavities formed by said grooves 3 for introducing a refrigerant under pressure, e.g., Freon, are covered, so that said cavities 3 form an expansion chamber, in which the compressed refrigerant can expand and evaporate. The soldered joint is designated by reference numeral 6 in FIG. 2.

The noncoated side of the ceramic plate 5 carries an electrical heating coil 7 with high electrical resistance, which has connections at its end for supply of current via a line 8. The gripping plate 1 with the ceramic plate 5 carrying the heating coil 7 is arranged on the lower side of a cover plate 14, leaving a space 9, which is sealed off by sealing rings 12 and 13 disposed in grooves 10 and respectively. The cover plate 14, the gripping plate 1 with the ceramic plate 5, and the heating coil 7 are surrounded by a retaining ring 15 and sealed in the upper zone by two sealing rings 17 located in a circular groove 16 of said cover plate 14, as well as by an additional sealing ring 18 in the lower zone of the retaining ring 15. A top ring 19 and a plurality of bolts 20 screwed into the retaining ring 15 serve to clamp the parts.

To meter and feed the refrigerant into the expansion chamber formed by said cavities 3, a solenoid valve 21 is provided, which is fastened to the inlet head 22 of a nipple 24 screwed into a threaded bore 23 in the cover plate 14 and is connected to a power source via electrical lines 25, 26. The inlet head 22 is connected to a feed pipe 29 for the pressurized refrigerant via a pipe section 27 and a screw coupling 28. The nipple 24 communicates with said cavities 3 through a bore 30 in said cover plate 14, a bore 31 in said ceramic plate 5, and an inlet duct 32, and said cavities can be connected to a refrigerant return line through a discharge duct 33 and an outlet pipe 34 inserted into said cover plate 14, so that said refrigerant is thus circulated in closed cycle. To supply humid air to the lower side of the gripping plate 1, which forms said gripping surface 2, a hole 35 is provided in said cover plate 14, and the hole 35 communicates with said space 9, from which the humid air reaches the gripping surface 2 through a plurality of holes 36 in said ceramic plate 5 and in said webs 4.

A heat sensor 37 is arranged in a recess 38 separated from said cavities 3 near the gripping surface 2 to monitor the temperature of the gripping plate 1. The heat sensor 37 is connected electrically via a multiwire cable 39.

For traction relief, the cable 39 and the conductor 8 are attached to the cover plate 14 by clamps 41 and bolts 42 at their end protected by an insulating tube 40.

Four spacers 43 are screwed into the top ring 19 and the cover plate 14, and a plate 44, in which a bolt 45 is fastened with its nut 46, is attached by bolts to the upper ends of said spacers. The upper end 47 of the bolt 45 has enlarged diameter and has a threaded hole 48 in order to fasten the freezing gripper, designated as a whole by reference numeral 49, to a driving means, e.g., the piston rod of a pneumatic cylinder. In this design, the freezing gripper 49 can be used to separate, deliver, and deposit small parts. For use for blanks with large surface areas, the freezing gripper 49, as shown in FIG. is fastened approximately in the middle of a form plate 50 such that the gripping surface 2 of the gripping plate 1 still projects downward beyond the lower side of the form plate 50. The contour shape of said form plate 50 is preferably adapted to the contour shape of the blanks to be handled.

The form plate 50 is bent upward at two opposite ends 51, 52. Two compressed air lines 53 and 54 are attached to the top side of said plate adjacent to said ends 51, 52 by, e.g., soldering or welding. The compressed air lines 53, 54 have air discharge nozzles 55 and 56, respectively, which extend nearly tangentially to the compressed air lines 53 and 54, respectively and through said form plate 50 and are directed obliquely downward and outward. The edges of the material blanks W are to be caused by the air stream discharged from said nozzles 55, 56 to come to lie on said plate 50 due to the buoyant effect (Coanda effect) now occurring.

One clamping lever 57 and 58, respectively, is associated with each of the bent ends 51, 52 of said form plate 50. The clamping levers 57, 58 are pivoted on support webs 59 and 60, respectively of said form plate 50. Double-acting pneumatic cylinders 61 and 12, respectively are provided to actuate said clamping levers 57, 58. The housing of a pneumatic cylinder 61 is hinged to a support web 63 of said form plate 50, and its piston rod 65, connected to the working piston 64, engages with said clamping lever 57. The housing of the other pneumatic cylinder 62 is hinged to a support web 66 of said form plate 50, and its piston rod 68, which is connected to the working piston 67, engages with said clamping lever 58.

Mode of Operation:

To grip the topmost material blank W, a certain amount of pressurized refrigerant, e.g., Freon, is introduced into the meander-shaped cavities 3 forming an expansion chamber, via said feed pipe 29, said pipe section 27, said inlet head 22, said pipe section 24, through said bores 30, 31, and said inlet duct 32 by actuating said solenoid valve 21, and the compressed refrigerant is able to expand and thus evaporate in the cavities. The expanded refrigerant is returned via the outlet duct 33 and the discharge pipe 34 connected to a refrigerant reservoir.

Heat is extracted from the gripping plate 1 during the evaporation of the refrigerant in said expansion chamber. Condensed water, which is able to condense from the humid air passed through the bore 35, the space 9, and the bores 36, is formed on said gripping surface 2 due to the cooling to below the freezing point. When the freezing gripper 49 is placed on the topmost material blank W, the condensed water freezes on said gripping surface 2, so that a firm connection is established by the layer of ice between the material blank W and the gripping plate 1.

Figure 1:
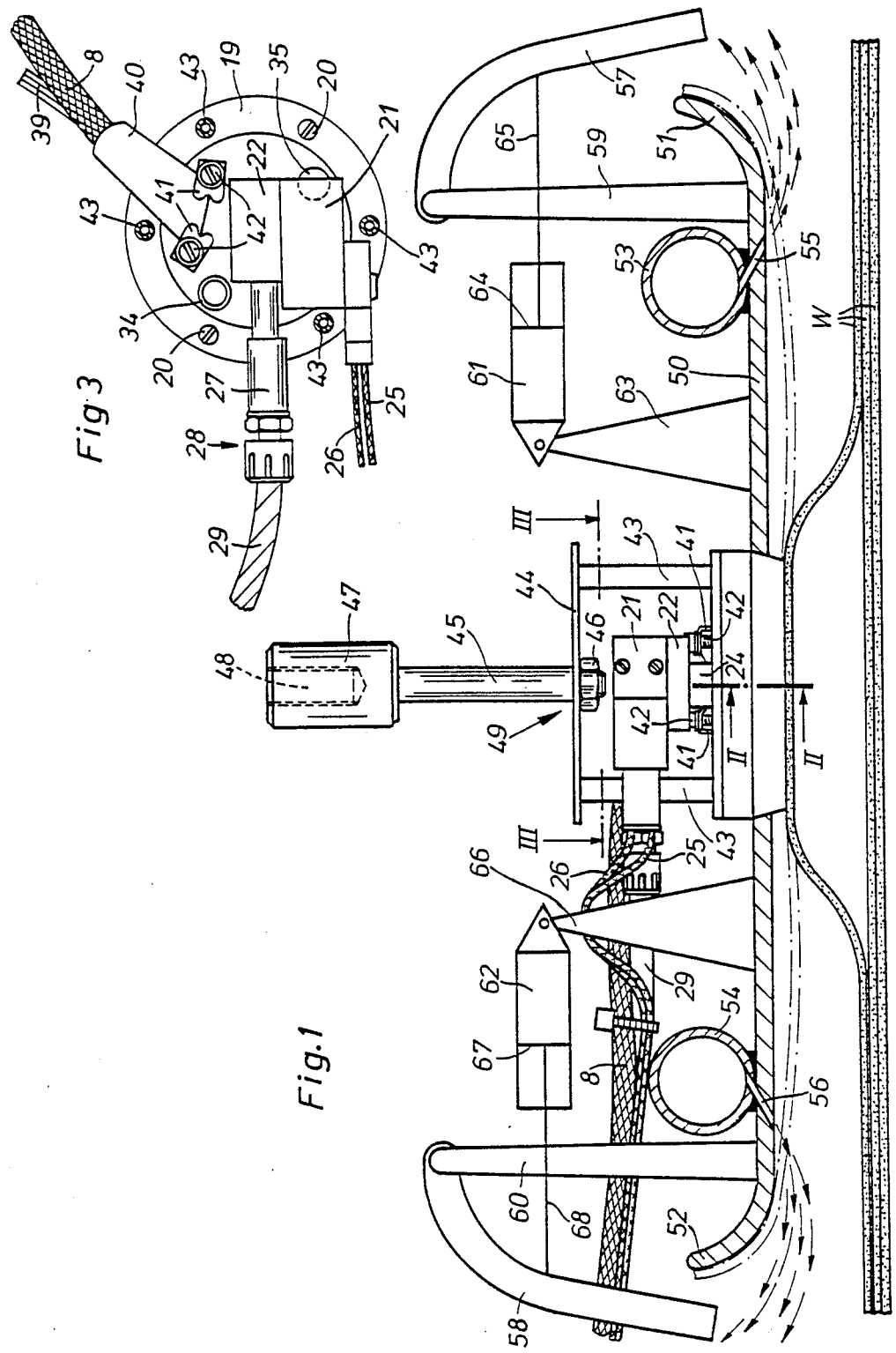
FIG. 1 is a simplified partially sectional view of a device equipped for handling material blanks with large surface areas on scale of approximately 1:1.

The freezing gripper 49 is subsequently caused to perform a short upward movement. Now it lifts the topmost blank frozen to it, as is illustrated in FIG. 1, by its middle area. Pulses of air, discharged from said nozzles 55, 56, are first generated, which cause the edges of the material blank W to flutter in order to detach fibers of material that became entangled during cutting in the stack. The material blank W is now lifted up over its entire surface area by a weak, uniform air stream due to the buoyant effect (Coanda effect) thus produced, and it will come to lie on the lower side of the form plate 50. By actuating the clamping levers 57, 58, the edges of the material blank W resting on the bent-off ends 51, 52 of the form plate 50 are clamped onto the form plate 50. The material blank W thus separated now can be transported to a processing station and detached there from said gripping surface 2 by turning on said heating coil 7 and opening the clamps formed by said clamping levers 57 and 58 and said bent ends 51, 52 of said form plate.

Since the thin ceramic plate 5 is coated with metal on one side, e.g., by vapor deposition or powder spraying according to a process described in DE- OS 27,05,588 or by application according to a process known from DE-OS 32,24,825, and the metal layer is in direct contact with said webs 4 of said gripping plate 1 via the silver solder junctions 6, rapid heat transfer to said gripping surface 2 to thaw the layer of ice is guaranteed. It is therefore sufficient to turn on said heating coil 7 only briefly. After its return to above the stack of material blanks W, the device is again ready to operate in a very short time.

While a specific embodiment of the invention has been shown and described in detail to illustrate the application of the principles of the invention, it will be understood that the invention may be embodied otherwise without departing from such principles.

What is claimed is:

1. A device for separating, delivering, and depositing stacked blanks of material, comprising:
a gripping plate formed of a material with good thermal conductivity, said gripping plate having a gripping surface that can be wetted with a liquid and including a plurality of webs defining a heat transfer bridge; a nonmetallic plate having a metal-coated surface connected to said plurality of webs, said nonmetallic plate and said griping plate cooperating to define a chamber adjacent said gripping surface, said nonmetallic plate having a noncoated surface with an electrical heating element arranged thereon; and refrigerant supply means, connected to said chamber, for supplying compressed refrigerant to said chamber, said compressed refrigerant introduced into said chamber expanding and freezing said wetted gripping surface for gripping said material blank, said heating element heating said gripping surface for depositing said material blank.

2. A device according to claim 1, wherein said webs subdivide said chamber into a plurality of cavities, said cavities being in communication with one another.

3. A device according to claim 1, wherein said nonmetallic plate is formed of a ceramic material, said metal-coated surface of said nonmetallic plate being soldered to said webs.

4. A device according to claim 1, further comprising an inlet opening to said chamber and an inlet valve connected to said inlet opening, said refrigerant supply means being connected to said chamber via said inlet valve and said inlet opening.

5. A device according to claim 1, further comprising a holder support carrying said gripper plate, said holder support including a water vapor inlet opening, said water vapor inlet opening being connected to said wetting means, said water vapor inlet opening communicating with said gripping surface through poles passing through said nonmetallic plate and said gripping plate.

6. A device according to claim 1, wherein said gripping plate is fastened to a form plate, said form plate being bent upwardly at least two opposite ends for adapting to the contour shape of the material blank, compressed air discharge nozzles positioned adjacent said at least two opposite ends for directing air, obliquely, outwardly and downwardly toward a stack of material blanks.

7. A device according to claim 6, wherein each of said at least two opposite ends is associated with a clamping lever mounted on said form plate for clamping the material blanks.

8. A device for separating, delivering, and depositing stacked blanks of material, comprising:
a gripping plate formed of a material with good thermal conductivity, said gripping plate having a gripping surface and including a plurality of webs defining a heat transfer bridge; a nonmetallic plate having a metal-coated surface connected to said plurality of webs, said nonmetallic plate and said griping plate cooperating to define a chamber adjacent said gripping surface, said nonmetallic plate having a noncoated surface with an electrical heating element arranged thereon; refrigerant supply means, connected to said chamber, for supplying compressed refrigerant to said chamber; and, wetting means, connected to said gripping plate, for wetting said gripping surface with a liquid, said compressed refrigerant introduced into said chamber expanding and freezing said wetted gripping surface for gripping said material blank, said heating element heating said gripping surface for depositing said material blank.

9. A device according to claim 8, wherein said webs subdivide said chamber into a plurality of cavities, said cavities being in communication with one another and said nonmetallic plate is formed of a ceramic material, said metal-coated surface of said nonmetallic plate being soldered to said webs.

* * * * *